(12) United States Patent
Kendrick

(10) Patent No.: US 8,689,562 B2
(45) Date of Patent: *Apr. 8, 2014

(54) COMBUSTION CAVITY LAYOUTS FOR FUEL STAGING IN TRAPPED VORTEX COMBUSTORS

(76) Inventor: Donald W. Kendrick, Bellevue, WA (US)

( * ) Notice: Subject to any disclaimer, the term of this patent is extended or adjusted under 35 U.S.C. 154(b) by 745 days.

This patent is subject to a terminal disclaimer.

(21) Appl. No.: 12/627,852

(22) Filed: Nov. 30, 2009

(65) Prior Publication Data

US 2011/0061392 A1    Mar. 17, 2011

Related U.S. Application Data

(60) Provisional application No. 61/241,940, filed on Sep. 13, 2009.

(51) Int. Cl.
*F02C 7/228*    (2006.01)

(52) U.S. Cl.
USPC .................. 60/737; 60/739; 60/746; 60/752; 60/755

(58) Field of Classification Search
USPC ........ 60/39.21, 733, 737, 746, 747, 749, 750, 60/752, 755, 757, 739
See application file for complete search history.

(56) References Cited

U.S. PATENT DOCUMENTS

| | | | |
|---|---|---|---|
| 1,284,182 A | 11/1918 | Doble | |
| 1,374,045 A | 4/1921 | Vezie | |
| 1,388,707 A | 8/1921 | Heinze | |
| 1,732,234 A | 10/1929 | Jensky | |
| 1,868,143 A | 7/1932 | Heinze | |
| 1,952,281 A | 3/1934 | Ranque | |
| 2,095,991 A | 10/1937 | Lysholm | |
| 2,236,426 A | 3/1941 | Faber | |
| 2,293,756 A | 8/1942 | Mackaye | |
| 2,303,381 A | 12/1942 | New | |

(Continued)

FOREIGN PATENT DOCUMENTS

| CH | 223843 A | 10/1942 |
|---|---|---|
| CH | 246353 A | 12/1946 |

(Continued)

OTHER PUBLICATIONS

Haynes et al., "Final Report—Advanced Combustion Systems for Next Generation Gas Turbines," Jan. 2006, GE Global Research, 1 Research Circle, Niskayuna, NY 12309.

(Continued)

*Primary Examiner* — Phutthiwat Wongwian
*Assistant Examiner* — Michael B Mantyla
(74) *Attorney, Agent, or Firm* — Hughes Hubbard & Reed LLP

(57) ABSTRACT

In one embodiment, alternative combustion cavity layouts are provided for practicing fuel staging in a trapped vortex (TVC) combustion apparatus comprising an inlet premixer, for injecting fuel-air mixture into the inlet of the combustion apparatus and one or more vortex premixers, for injecting fuel-air mixture into the recirculating vortex within each of one or more trapped vortex cavities. A plurality of TVC cavities, may, for example, be laid out axially, radially, peripherally, internally, or in combinations of such arrangements. These layouts may be used in conjunction with a fuel staging method whereby the relative proportion of mixture introduced through the inlet and the respective vortex premixers can be varied as a function of operating conditions.

19 Claims, 9 Drawing Sheets

(56) References Cited

U.S. PATENT DOCUMENTS

| | | | |
|---|---|---|---|
| 2,322,987 A | 6/1943 | West | |
| 2,354,213 A | 12/1943 | Jendrassik | |
| 2,401,826 A | 6/1946 | Halford | |
| 2,409,159 A | 10/1946 | Singleton | |
| 2,410,259 A | 10/1946 | Birmann | |
| 2,441,751 A | 5/1948 | Broggi | |
| 2,469,678 A | 5/1949 | Wyman | |
| 2,506,581 A | 5/1950 | Cowles, Jr. | |
| 2,532,740 A | 12/1950 | Speer | |
| 2,535,488 A | 12/1950 | Dros | |
| 2,579,049 A | 12/1951 | Price | |
| 2,656,147 A | 10/1953 | Brownhill | |
| 2,701,444 A * | 2/1955 | Day | 60/737 |
| 2,715,011 A | 8/1955 | Schorner | |
| 2,722,101 A | 11/1955 | Wosika | |
| 2,726,511 A | 12/1955 | Pitt | |
| 2,784,551 A | 3/1957 | Karlby | |
| 2,821,067 A | 1/1958 | Hill | |
| 2,823,520 A | 2/1958 | Spalding | |
| 2,862,359 A | 12/1958 | Spears, Jr. | |
| 2,959,215 A | 11/1960 | Warnecke | |
| 2,970,438 A * | 2/1961 | Howald | 60/739 |
| 2,973,808 A | 3/1961 | Fox, Jr. | |
| 2,986,882 A | 6/1961 | Pavlecka | |
| 2,999,359 A * | 9/1961 | Murray | 60/733 |
| 3,034,298 A | 5/1962 | White | |
| 3,167,913 A | 2/1965 | Muhlberg | |
| 3,209,536 A | 10/1965 | Howes | |
| 3,255,586 A | 6/1966 | Hennig | |
| 3,280,555 A | 10/1966 | Charpentier | |
| 3,287,904 A | 11/1966 | Warren | |
| 3,309,866 A | 3/1967 | Kydd | |
| 3,361,183 A | 1/1968 | Reichhelm | |
| 3,369,361 A | 2/1968 | Craig | |
| 3,418,808 A | 12/1968 | Rich | |
| 3,469,396 A | 9/1969 | Onishi | |
| 3,527,054 A | 9/1970 | Hemsworth | |
| 3,597,134 A | 8/1971 | Bailey | |
| 3,609,967 A | 10/1971 | Waldmann | |
| 3,613,360 A | 10/1971 | Howes | |
| 3,625,003 A | 12/1971 | Liddle | |
| 3,633,361 A | 1/1972 | Bauger et al. | |
| 3,689,039 A | 9/1972 | Kilgren | |
| 3,699,681 A | 10/1972 | Frutschi | |
| 3,703,808 A | 11/1972 | Stearns | |
| 3,705,784 A | 12/1972 | Reichhelm | |
| 3,727,401 A | 4/1973 | Fincher | |
| 3,751,911 A | 8/1973 | De Tartaglia | |
| 3,775,974 A | 12/1973 | Silver | |
| 3,785,145 A | 1/1974 | Amann | |
| 3,800,527 A | 4/1974 | Marshall | |
| 3,826,083 A | 7/1974 | Brandon | |
| 3,826,084 A | 7/1974 | Branstrom | |
| 3,856,455 A | 12/1974 | Otway | |
| 3,876,363 A | 4/1975 | La Haye | |
| 3,883,263 A | 5/1975 | Mai | |
| 3,886,732 A | 6/1975 | Gamell | |
| 3,907,457 A | 9/1975 | Nakamura et al. | |
| 3,927,958 A | 12/1975 | Quinn | |
| 3,971,209 A | 7/1976 | de Chair | |
| 3,971,210 A | 7/1976 | Rose | |
| 3,980,422 A | 9/1976 | Dennis | |
| 3,982,910 A | 9/1976 | Houseman | |
| 3,990,831 A | 11/1976 | Syska | |
| 3,994,665 A | 11/1976 | Young | |
| 4,003,199 A | 1/1977 | Bell, III | |
| 4,008,041 A | 2/1977 | Roffe | |
| 4,020,809 A | 5/1977 | Kern | |
| 4,022,544 A | 5/1977 | Garkusha | |
| 4,024,705 A | 5/1977 | Hedrick | |
| 4,032,305 A | 6/1977 | Squires | |
| 4,046,223 A | 9/1977 | McHugh | |
| 4,084,922 A | 4/1978 | Glenn | |
| 4,091,613 A | 5/1978 | Young | |
| 4,100,733 A | 7/1978 | Striebel | |
| 4,118,927 A | 10/1978 | Kronogard | |
| 4,130,388 A | 12/1978 | Flanagan | |
| 4,140,473 A | 2/1979 | Hoehing | |
| 4,142,836 A | 3/1979 | Glenn | |
| 4,149,503 A | 4/1979 | Ozaki | |
| 4,151,709 A | 5/1979 | Melconian | |
| 4,183,420 A | 1/1980 | Kinoshita | |
| 4,193,568 A | 3/1980 | Heuvel | |
| 4,204,401 A | 5/1980 | Earnest | |
| 4,213,297 A | 7/1980 | Forster | |
| 4,224,912 A | 9/1980 | Tanaka | |
| 4,277,938 A | 7/1981 | Belke | |
| 4,280,817 A | 7/1981 | Chauhan | |
| 4,311,431 A | 1/1982 | Barbeau | |
| 4,329,114 A | 5/1982 | Johnston | |
| 4,338,780 A | 7/1982 | Sakamoto | |
| 4,338,781 A | 7/1982 | Belke | |
| 4,350,008 A | 9/1982 | Zickwolf, Jr. | |
| 4,368,619 A | 1/1983 | Levesque | |
| 4,370,094 A | 1/1983 | Ambrosch | |
| 4,379,082 A | 4/1983 | Gauchon | |
| 4,426,842 A | 1/1984 | Collet | |
| 4,433,540 A | 2/1984 | Cornelius | |
| 4,455,839 A | 6/1984 | Wuchter | |
| 4,455,840 A | 6/1984 | Matt | |
| 4,470,261 A | 9/1984 | Kronogard | |
| 4,501,053 A | 2/1985 | Craig | |
| 4,502,277 A | 3/1985 | Papastavros | |
| 4,511,364 A | 4/1985 | Mitsumori | |
| 4,522,557 A | 6/1985 | Bouiller | |
| 4,549,402 A | 10/1985 | Saintsbury | |
| 4,563,875 A | 1/1986 | Howald | |
| 4,586,328 A | 5/1986 | Howald | |
| 4,627,855 A | 12/1986 | Mathiesen | |
| 4,629,413 A | 12/1986 | Michelson | |
| 4,641,495 A | 2/1987 | Mowill | |
| 4,704,136 A | 11/1987 | Weston | |
| 4,726,192 A * | 2/1988 | Willis et al. | 60/737 |
| 4,732,091 A | 3/1988 | Gould | |
| 4,790,133 A | 12/1988 | Stuart | |
| 4,791,784 A | 12/1988 | Minardi | |
| 4,817,858 A | 4/1989 | Verpoort | |
| 4,831,817 A | 5/1989 | Linhardt | |
| 4,845,941 A | 7/1989 | Paul | |
| 4,894,005 A | 1/1990 | Keller | |
| 4,899,537 A | 2/1990 | Cheng | |
| 4,991,391 A | 2/1991 | Kosinski | |
| 5,003,766 A | 4/1991 | Paul | |
| 5,022,851 A | 6/1991 | Reiser | |
| 5,054,279 A | 10/1991 | Hines | |
| 5,095,221 A | 3/1992 | Tyler | |
| 5,123,242 A | 6/1992 | Miller | |
| 5,148,670 A | 9/1992 | Birch | |
| 5,174,108 A | 12/1992 | Shekleton | |
| 5,193,337 A | 3/1993 | Harboe | |
| 5,195,884 A | 3/1993 | Schwartz | |
| 5,198,310 A | 3/1993 | Fleming | |
| 5,201,530 A | 4/1993 | Kelch | |
| 5,201,796 A | 4/1993 | Glinski | |
| 5,212,943 A | 5/1993 | Harris | |
| 5,231,833 A | 8/1993 | MacLean | |
| 5,232,335 A | 8/1993 | Narayana | |
| 5,255,507 A | 10/1993 | Gounder | |
| 5,265,425 A | 11/1993 | Howell | |
| 5,266,024 A | 11/1993 | Anderson | |
| 5,269,133 A | 12/1993 | Wallace | |
| 5,280,703 A | 1/1994 | Corrado | |
| 5,310,319 A | 5/1994 | Grant | |
| 5,319,935 A * | 6/1994 | Toon et al. | 60/733 |
| 5,323,603 A | 6/1994 | Malohn | |
| 5,331,803 A | 7/1994 | Shekleton | |
| 5,350,293 A | 9/1994 | Khinkis | |
| 5,385,012 A | 1/1995 | Rowe | |
| 5,406,796 A | 4/1995 | Hiereth | |
| 5,415,478 A | 5/1995 | Matthews | |
| 5,432,007 A | 7/1995 | Naito | |
| 5,442,904 A | 8/1995 | Shnaid | |
| 5,452,574 A | 9/1995 | Cowell | |
| 5,473,881 A | 12/1995 | Kramnik | |

(56) References Cited

U.S. PATENT DOCUMENTS

| | | |
|---|---|---|
| 5,473,882 A | 12/1995 | Zarzalis |
| 5,497,615 A | 3/1996 | Noe |
| 5,575,616 A | 11/1996 | Hagle |
| 5,597,167 A | 1/1997 | Snyder |
| 5,628,182 A | 5/1997 | Mowill |
| 5,651,252 A | 7/1997 | Ansart |
| 5,669,216 A | 9/1997 | Ankersmit |
| 5,727,378 A | 3/1998 | Seymour |
| 5,740,745 A | 4/1998 | Smyrniotis |
| 5,762,156 A | 6/1998 | Bates |
| 5,771,696 A | 6/1998 | Hansel |
| 5,791,148 A | 8/1998 | Burrus |
| 5,794,431 A | 8/1998 | Utamura et al. |
| 5,819,522 A | 10/1998 | Topsøe |
| 5,857,339 A | 1/1999 | Roquemore |
| 5,894,806 A | 4/1999 | Smyrniotis |
| 5,927,067 A * | 7/1999 | Hanloser et al. ............... 60/761 |
| 5,934,065 A | 8/1999 | Bronicki |
| 6,027,333 A | 2/2000 | Fujii |
| 6,032,466 A | 3/2000 | Woollenweber |
| 6,039,560 A | 3/2000 | Kubota |
| 6,047,540 A | 4/2000 | Dev |
| 6,050,095 A | 4/2000 | Blake |
| 6,077,035 A | 6/2000 | Walters |
| 6,134,876 A | 10/2000 | Hines |
| 6,141,954 A * | 11/2000 | Sowa et al. ............... 60/776 |
| 6,142,729 A | 11/2000 | Tran |
| 6,145,296 A | 11/2000 | Rakhmailov |
| 6,192,669 B1 | 2/2001 | Keller |
| 6,212,871 B1 | 4/2001 | Rakhmailov |
| 6,234,746 B1 | 5/2001 | Schroder |
| 6,240,732 B1 | 6/2001 | Allan |
| 6,272,844 B1 | 8/2001 | Rakhmailov |
| 6,295,801 B1 * | 10/2001 | Burrus et al. ............... 60/776 |
| 6,305,157 B1 | 10/2001 | Rakhmailov |
| 6,325,147 B1 | 12/2001 | Doerler |
| 6,331,006 B1 | 12/2001 | Baily |
| 6,350,116 B1 | 2/2002 | Herrmann |
| 6,434,945 B1 | 8/2002 | Mandai |
| 6,442,939 B1 * | 9/2002 | Stuttaford et al. ............... 60/737 |
| 6,481,209 B1 * | 11/2002 | Johnson et al. ............... 60/746 |
| 6,490,864 B1 * | 12/2002 | Joos et al. ............... 60/725 |
| 6,562,086 B1 | 5/2003 | Gentry |
| 6,564,555 B2 * | 5/2003 | Rice et al. ............... 60/746 |
| 6,663,380 B2 | 12/2003 | Rabovitser |
| 6,663,752 B2 | 12/2003 | Santilli |
| 6,669,463 B2 | 12/2003 | Beutel |
| 6,672,863 B2 | 1/2004 | Doebbeling |
| 6,702,568 B1 | 3/2004 | Park |
| 6,735,949 B1 * | 5/2004 | Haynes et al. ............... 60/746 |
| 6,761,033 B2 | 7/2004 | Inoue |
| 6,851,263 B2 * | 2/2005 | Stumpf et al. ............... 60/750 |
| 6,875,009 B2 | 4/2005 | Kayahara |
| 6,895,759 B2 | 5/2005 | Knoepfel |
| 7,003,961 B2 | 2/2006 | Kendrick |
| 7,036,321 B2 * | 5/2006 | Dudebout et al. ............... 60/804 |
| 7,074,033 B2 | 7/2006 | Neary |
| 7,086,854 B2 | 8/2006 | Rakhmailov |
| 7,127,897 B2 | 10/2006 | Carrea |
| 7,147,461 B2 | 12/2006 | Neary |
| 7,237,385 B2 | 7/2007 | Carrea |
| 7,318,317 B2 | 1/2008 | Carrea |
| 7,603,841 B2 | 10/2009 | Steele |
| 8,197,249 B1 * | 6/2012 | Nguyen ............... 431/12 |
| 8,272,219 B1 * | 9/2012 | Johnson et al. ............... 60/746 |
| 8,297,057 B2 * | 10/2012 | Toon ............... 60/746 |
| 8,365,531 B2 * | 2/2013 | Pidcock et al. ............... 60/737 |
| 2002/0184814 A1 | 12/2002 | Manka |
| 2003/0074163 A1 * | 4/2003 | Anand et al. ............... 703/1 |
| 2004/0011054 A1 | 1/2004 | Inoue |
| 2004/0219079 A1 * | 11/2004 | Hagen et al. ............... 422/194 |
| 2005/0034458 A1 | 2/2005 | Burrus |
| 2005/0084812 A1 | 4/2005 | Rakhmailov |
| 2005/0150376 A1 | 7/2005 | Crawley |
| 2005/0172618 A1 | 8/2005 | Sasaki |
| 2005/0172619 A1 | 8/2005 | Sasaki |
| 2006/0000216 A1 | 1/2006 | Dinu |
| 2006/0035188 A1 | 2/2006 | Berenbrink |
| 2006/0107667 A1 | 5/2006 | Haynes |
| 2006/0191268 A1 * | 8/2006 | Widener et al. ............... 60/772 |
| 2007/0141519 A1 | 6/2007 | Lauer |
| 2007/0151248 A1 | 7/2007 | Scarinci |
| 2007/0178035 A1 | 8/2007 | White |
| 2007/0193110 A1 | 8/2007 | Schwab |
| 2008/0041059 A1 | 2/2008 | Teets |
| 2008/0092544 A1 | 4/2008 | Rakhmailov |
| 2008/0271703 A1 | 11/2008 | Armstrong |
| 2009/0148918 A1 | 6/2009 | Trimbur |

FOREIGN PATENT DOCUMENTS

| | | |
|---|---|---|
| CH | 258675 A | 12/1948 |
| CH | 266731 A | 2/1950 |
| CH | 384942 A | 2/1965 |
| CH | 510821 A | 7/1971 |
| CN | 1401938 A | 3/2003 |
| DE | 383932 C1 | 10/1923 |
| DE | 867634 C1 | 2/1953 |
| DE | 897902 C1 | 11/1953 |
| DE | 1011670 B | 7/1957 |
| DE | 2018641 B1 | 10/1971 |
| DE | 2018641 C2 | 5/1972 |
| DE | 2332698 A1 | 1/1974 |
| DE | 2335594 A1 | 8/1974 |
| DE | 2437990 A1 | 2/1976 |
| DE | 2937631 A1 | 4/1981 |
| DE | 3202358 A1 | 8/1983 |
| DE | 3713923 A1 | 11/1987 |
| DE | 3817617 A1 | 7/1989 |
| DE | 3835932 A1 | 4/1990 |
| DE | 3835932 C2 | 4/1992 |
| DE | 4331779 A1 | 3/1995 |
| DE | 3713923 C2 | 2/1998 |
| EP | 103370 A1 | 3/1984 |
| EP | 127562 A2 | 12/1984 |
| EP | 206683 A2 | 12/1986 |
| EP | 127562 A3 | 4/1987 |
| EP | 353192 A1 | 1/1990 |
| EP | 127562 B1 | 8/1990 |
| EP | 752515 A2 | 1/1997 |
| EP | 761943 A1 | 3/1997 |
| EP | 95882 A1 | 3/2000 |
| FR | 882329 A | 5/1943 |
| FR | 1058197 A | 3/1954 |
| FR | 1163559 A | 9/1958 |
| FR | 1166419 A | 11/1958 |
| FR | 2385899 A | 10/1978 |
| FR | 2577990 A1 | 8/1986 |
| GB | 196452 A | 4/1923 |
| GB | 1170793 A | 11/1969 |
| GB | 1381347 A | 1/1975 |
| GB | 1435687 A | 5/1976 |
| GB | 2018641 A | 10/1979 |
| GB | 2018641 B | 6/1982 |
| GB | 2119027 A | 11/1983 |
| GB | 2332698 A | 6/1999 |
| GB | 2335594 A | 9/1999 |
| GB | 2335594 B | 8/2000 |
| GB | 2437990 A | 11/2007 |
| WO | WO2008/133695 | 11/2008 |

OTHER PUBLICATIONS

Haynes et al., Advanced Combustion Systems for Next Generation Gas Turbines, Jan. 2006.

Roquemore et al., Role of Flow Visualization in the Development of UNICORN, Dec. 6, 1998.

* cited by examiner

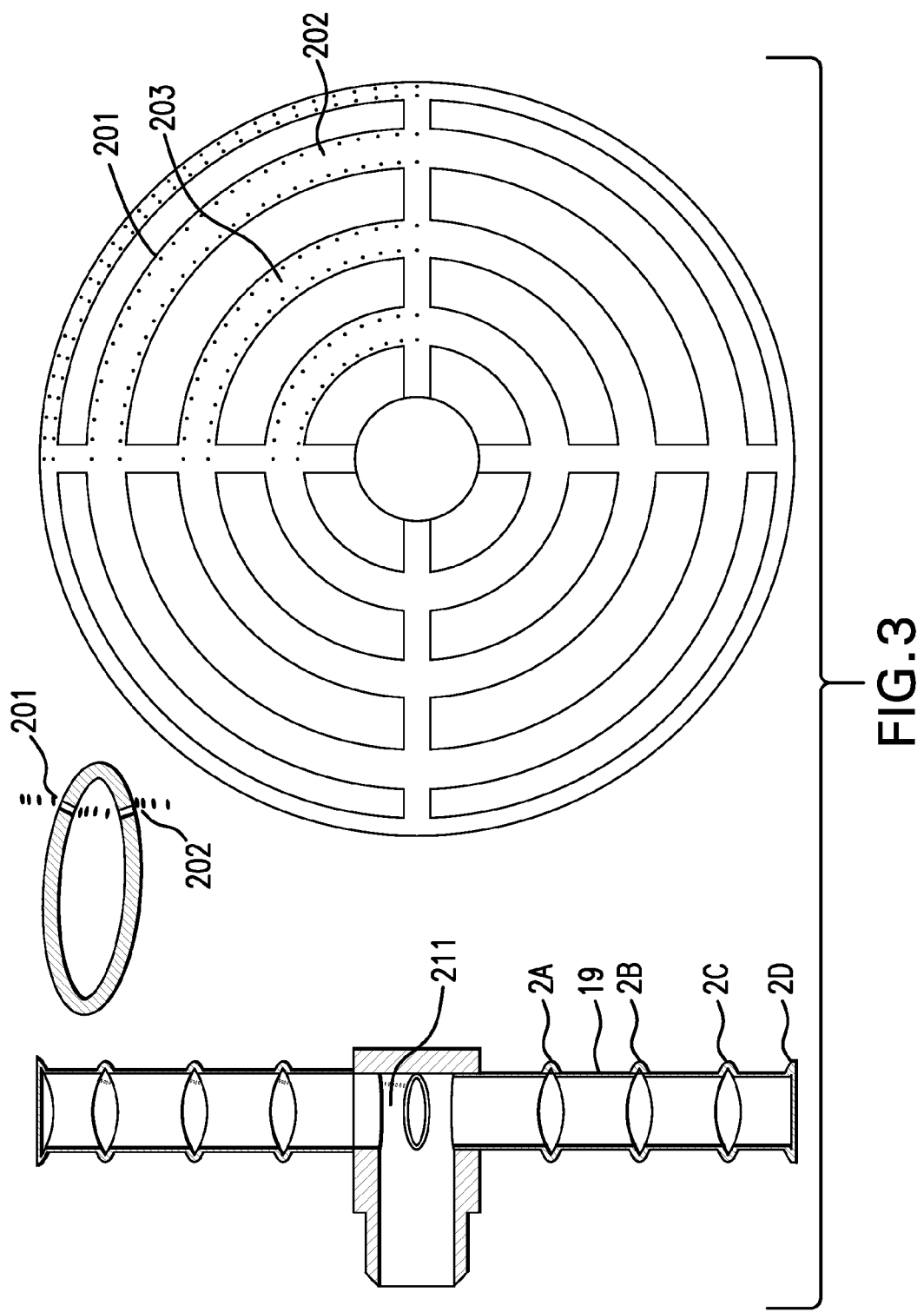

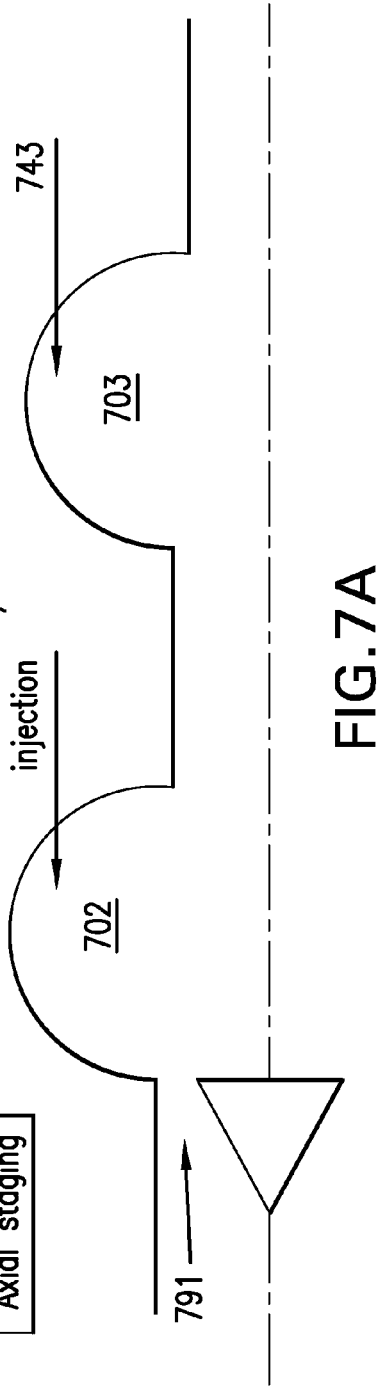

COMBUSTION CAVITY LAYOUTS FOR FUEL STAGING IN TRAPPED VORTEX COMBUSTORS

CROSS-REFERENCE TO RELATED APPLICATIONS

This application claims the benefit pursuant to 35 U.S.C. §119(e) of U.S. provisional patent application 61/241,940, filed Sep. 13, 2009, the entire disclosure of which is incorporated herein by reference for all purposes.

BACKGROUND OF THE INVENTION

1. Field of the Invention

The invention is in the fields of combustion and gas turbines, and especially gas turbine designs for dry low emissions, and more particularly concerns apparatus and methods for premixing fuel and air to achieve ultra low combustion emissions.

2. Description of the Related Art

A premixer can be useful in enhancing flame stability in an energy release/conversion system, such as a combustor for powering a gas turbine engine or generator. For purposes of brevity, this disclosure uses the term "combustor" throughout, but it should be understood that the disclosure relates more generally to energy release/conversion systems that can be operated as either a combustor or a fuel reformer, depending on operating conditions, as well as dedicated combustor and reformer apparatus. Unless the context clearly requires otherwise, the terms "combustor", "reformer" and "energy release/conversion system" should be regarded as completely interchangeable.

Premixers currently employed in the art include "hub and spoke" configured units, such as those employed by General Electric, Pratt & Whitney, Siemens, etc., placed at the inlet of a combustor, with fuel supplied through the hub and injected out of radial spokes and/or integrated into swirler vanes. The spokes of these premixers have a plurality of uniform sized axial holes transverse to the combustor inlet. The design of these premixers tends to optimize them for a particular fuel-air momentum flux ratio. Accordingly, these premixers work best in a narrow power band, and do not provide the most uniform fuel-air mixture over the entire engine operating envelope. The system would generate either too lean or too rich fuel-air zones, adversely impacting emissions. It appears, therefore, that further improvement in the operation of energy release/conversion systems might be possible by redesigning the premixing apparatus used in conjunction with these systems to perform better over a broader range of operating conditions.

In one class of combustion apparatus, known as "trapped vortex" combustors (TVCs, as addressed at further length later in this disclosure), a cavity is provided in the combustion area, for example, between bluff bodies or in the wall of the combustor, in which vortices and/or other turbulence will form, in order to stabilize combustion with lean mixtures. See for example U.S. Pat. No. 5,857,339 to Roquemore et al. Fuel and/or air may be injected into a trapped vortex cavity through discrete injectors, to induce greater mixing in this area and further promote flame stability. The discrete fuel and air injectors may be situated, for example, on the forward and aft walls of a trapped vortex area defined by the walls of the combustion cavity. See, e.g., Burrus, U.S. Pat. No. 5,791,148.

Haynes, et al., GE Global Research, "Advanced Combustion Systems for Next Generation Gas Turbines, Final Report", January 2006 (DE-FC26-01NT41020), describes a combustor similar in layout to the combustor described by Burrus. In certain embodiments disclosed by Haynes et al., as an alternative to discrete fuel and air inlets, as previously practiced, fuel and air may be premixed and introduced through the inlet cone and/or through the forward or aft walls of the combustion cavity. Embodiments in which premixture was introduced both into the inlet cone and the combustion cavity resulted in the creation of a stacked double vortex, with highly turbulent mixing.

Steele, et al., in U.S. Pat. No. 7,603,841, describing another TVC embodiment, discloses a combustor having inlet premixing as well as aft injectors into a combustion cavity defined in part by a bluff body. In this embodiment, the aft injectors are pointed in a direction opposite to incoming premixture flow to induce turbulent vortex mixing.

Heretofore, all TVC designs that have injected fuel, air and/or premixed fuel and air into the combustion cavity have been designed to induce turbulence, to cause the formation of additional vortices, or otherwise to increase turbulent mixing in the vortex cavity. For example, FIG. 3-7 of Haynes et al. shows a dual trapped vortex in each TVC cavity. The "natural" flow that would occur in these cavities, meaning the fluid flow that would naturally occur in the cavities in the absence of the premixture injection, given the flow otherwise taking place through the main flow path of the combustor, would be a single vortex. In the case shown in FIG. 3-7 of Haynes et al., the second vortex in the "dual vortex" show is created by the injection of premixture into the TVC cavity, and would not otherwise exist. In other cases, for example, where only a single vortex is provided, the main vortex shown might otherwise exist, but is substantially modified by the impact of the added premixture, for example, by being moved translationally from its natural position in the cavity, made much more turbulent, or otherwise substantially distorted.

Commonly assigned U.S. Pat. Pub. 2008/0092544 A1, by Rakhmailov (Rakhmailov '544 publication), discloses a premixer deployed in combination with a combustor designed in accordance with the disclosure of commonly assigned U.S. Pat. No. 7,086,854 to Rakhmailov et al. (Rakhmailov '854). The premixer in the Rakhmailov '544 publication is deployed only at the inlet of the combustor. The inlet of this combustor has a high velocity of fluid flow, and thus the inlet premixing is done in a high-velocity environment.

While the design described in the Rakhmailov '544 publication adds an inlet premixer to the recirculating vortex combustor described in Rakhmailov '854, neither disclosure contains any provision for injection of fuel, air and/or premixed fuel and air directly into the vortex cavity. Indeed, Rakhmailov '854 expressly teaches away from admitting fuel into the hot recirculating gas in a recirculation vortex cavity, stating that turbulent mechanical mixing can reduce overall recirculation velocity, result in nonuniform fuel distribution, and reduce temperatures where the recirculating flow joins the inlet flow, contrary to the design goals of Rakhmailov '854.

The entire respective disclosures of Roquemore et al., Burris, Haynes et al., Steele et al., Rakhmailov '854, and the Rakhmailov '544 publication are each incorporated by reference herein in their entirety, for all purposes.

It would be desirable to improve upon the prior art in a number of respects. First, it would be desirable to improve inlet premixers for any type of combustor by making the premixer more adaptable to a wider range of operating conditions. Second, it would be desirable to provide for premixing in the vortex area of a combustor to enhance rather than disrupt normal vortex flow. Third, it would be desirable to provide methods for using inlet and vortex premixers advantageously in combination with each other.

SUMMARY OF THE INVENTION

It is an object of the invention to provide a superior fuel-air pre-mixing apparatus and method for use in combustors.
Desired attributes of such premixer apparatus include:
The premixer should provide uniform fuel distribution over the cross sectional area of the combustor inlet.
The premixer should provide a uniform fuel-air mixture over a broad range of engine operating conditions.
The premixer should provide a short premixing length.
The premixer should be compatible with a broad range of fuels, including all gaseous and liquid fuels used in gas turbines.
The premixer should provide low emissions generation.
The premixer, or a separate premixer, should be adaptable to assist in stabilizing combustion in the trapped vortex cavity of a TVC, consistent with the flow patterns for which the TVC was designed, including low-turbulence patterns, where those are employed.
It should be possible to coordinate the operation of any plurality of premixers employed in the design to provide the best operation over the operating range of the system.
The premixer systems and methods provided should be applicable to a broad range of applications.

In one embodiment, these objectives may be achieved by providing an inlet premixer assembly comprising a hub, a plurality of radial spokes, and a plurality of concentric, aerodynamic injector rings attached to the spokes, with a plurality of radially-directed injection holes. The injection holes are provided with a plurality of different diameters, facilitating good mixing over a broad power range. Due to configuration and hole sizes, the assembly is gas and liquid compatible. The radial, concentric injection formation allows for a short injection path, due to the greater number of fuel injection sites over the cross-sectional area.

In a second aspect, for use in conjunction with trapped-vortex reactor designs, a further premixer embodiment may be provided that injects premixed fuel and air directly into the trapped vortex cavity in a manner compatible with the flow patterns in the cavity for which the system was designed. When used in conjunction with a recirculating vortex design, this premixer can be arranged so that the premixed fuel and air joins the vortex flow tangentially in a smooth, continuous manner and/or to reinforce combustion in the toroid. In other designs, premixture may be introduced at one or more TVC locations in one or more directions consistent with local vortex flow in the area of introduction.

Methods may also provided for the two embodiments described above to be used in conjunction with each other, and their settings adjusted in coordination with each other, for fuel staging during operation. Extremely low emissions results have been achieved in this manner.

In other embodiments, alternative combustion cavity layouts are provided for practicing fuel staging in a trapped vortex (TVC) combustion apparatus comprising an inlet premixer, for injecting fuel-air mixture into the inlet of the combustion apparatus and one or more vortex premixers, for injecting fuel-air mixture into the recirculating vortex within each of one or more trapped vortex cavities. A plurality of premixer-fed TVC cavities, may, for example, be laid out axially, radially, peripherally, internally, or in combinations of such arrangements. These layouts may be used in conjunction with a fuel staging method whereby the relative proportion of mixture introduced through the inlet and the respective vortex premixers can be varied as a function of operating conditions.

Combustion apparatus and methods in accordance with the invention may be used in all gas turbine applications, including without limitation land-based power generation, commercial jet aircraft engines, auxiliary power units (APUs) for aircraft, in Integrated Gasification Combined Cycle (IGCC) plants, and in Combined Heat and Power (CHP) or cogeneration plants.

Other aspects and advantages of the invention will be apparent from the accompanying drawings, and the detailed description that follows.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 are additional cross-sectional views of the inlet premixer illustrated in FIGS. 2A and 2B, also showing the placement of fuel injection orifices in the injector rings.

FIGS. 7A-7D show a variety of combustor layouts incorporating a plurality of TVC cavities may be used in conjunction with individually controllable inlet and vortex premixers.

DETAILED DESCRIPTION OF PREFERRED EMBODIMENTS

Figure 1:
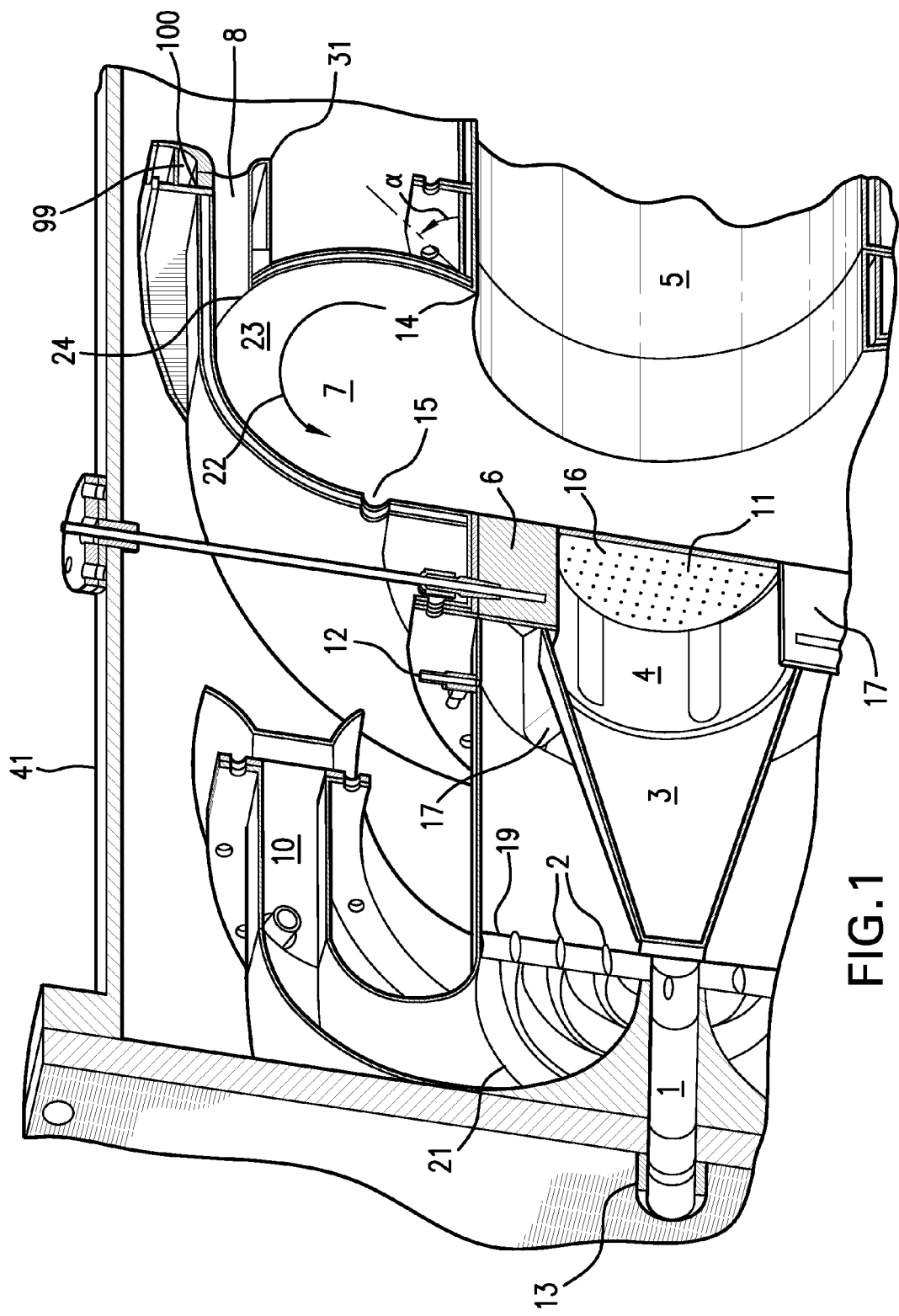
FIG. 1 is a perspective cross-sectional view from the inlet side to the exit side of a can-annular combustor incorporating two different premixer devices in accordance with certain embodiments of the invention.

The following is a detailed description of certain embodiments of the invention chosen to provide illustrative examples of how it may advantageously be implemented. The scope of the invention is not limited to the specific embodiments described, nor is it limited by any specific implementation, composition, embodiment or characterization depicted in the accompanying drawings or stated or described in the invention summary or the abstract. In addition, it should be noted that this disclosure describes a number of methods that each comprise a plurality of steps. Nothing contained in this written description should be understood to imply any necessary order of steps in such methods, other than as specified by express claim language.

The present disclosure is applicable to any gas turbine combustor or reaction chamber. Certain aspects of this disclosure are relevant to any energy release/conversion system having an inlet for gaseous or gas-borne liquid fuel and oxidant (air). Other aspects are relevant insofar as the energy release/conversion system has TVC features, as will be addressed.

Among the varieties of energy release/conversion apparatus are combustors and reaction chambers having a substantially steady-state vortex circulation in some aspect, situated at least in part off of a direct flow path from combustor inlet to exit. The term "trapped vortex combustor" (TVC), used herein to denote one class of equipment to which the present disclosure is applicable, will be used as a most general reference to energy release/conversion systems (both combustors and/or reformers) having such characteristics, and the internal portion of the combustor containing the vortex will be referred to as the "trapped vortex reaction cavity". A trapped vortex cavity may have contain one vortex flows, double vortex flows, or a plurality of vortex flows. The trapped vortex cavity may have continuously curved walls, or it may have rectilinear or other shaped walls, or be formed between bluff bodies, or a combination of walls and bluff bodies. A combustor or reaction chamber may also have a plurality of trapped vortex cavities. Examples of TVC embodiments in accordance with Roquemore, et al., Burrus, Haynes et al. and Steele et al. were previously discussed. The energy release/conversion system disclosed in Rakhmailov '854, though different in material respects from those TVCs, should also considered a TVC for purposes of the terminology employed in this disclosure.

Additional considerations can be relevant with regard to TVCs, depending on reactor design. The vortex is often designed to help maintain flame stability of the combustor. Some designs further rely on using low turbulence characteristics to help achieve uniform mixing, permitting lean mixtures to be burned at relatively low combustion temperatures, with consequent improvements in emissions. In practice, the operation of an energy release/conversion system may be subject to fluctuations and perturbations, for example, as a result of discontinuities in fuel flow or compressor flow, small surface discontinuities, or statistical anomalies resulting from small deviations from continuous and laminar flow as inevitably result when real fluids dynamically travel at high speeds along real machine surfaces and chemically react with each other in real time. Such fluctuations and discontinuities can lead to flame instability from time to time. Thorough fuel and air mixing prior to combustion (or reformation) can be used to improve the emissions performance and stability of such designs, as well as other designs in which turbulence may be permitted or promoted after introduction of the fuel-air mixture.

In TVC designs, premixers upstream of the main inlet have been employed to help mix fuel and air. However, experimentation has shown that there is considerable room for improvement in the performance of these inlet premixer designs.

In certain TVC designs, fuel, air and/or premixed fuel and air have been injected directly into the combustion vortex to stabilize overall combustor operation. For example, it has been the object of certain such designs to use a vortex premixer, or discrete injection of fuel and/or air, to induce one or more additional vortices (where fewer or only one vortex would otherwise exist), to create more mixing turbulence and increase residence time of fluid in the TVC vortex cavity. However, such direct fuel or mixture injection, as previously practiced, wherein fuel, air and/or premixed fuel and air is injected disruptively to natural vortex flow can lead to irregular mixing and hot spots and be suboptimal for emissions control.

Thus, additional and different modes of premixing beyond those already practiced in this field, could be advantageous, both for TVC (including low-turbulence TVC) and non-TVC designs. However, there are certain issues that must be overcome in order to successfully use a premixer.

An energy release/conversion system is typically fed combustion air in a compressed state, from a compressor. Premixed fuel and air under the relatively high pressures and temperatures that characterize compressor outputs tend to be highly explosive. To avoid such an explosion, premixing in such an environment may be performed in a manner that reduces the residence time of the premixed mixture prior to introduction into the combustion chamber. This means that the premixing apparatus should preferably be as close as practicable to the combustor inlet (short premixing length), while at the same time providing for adequate residence time for the desired level of premixing (achievable in part by having small premixing scales). Accordingly, configurations for achieving fast and uniform premixing are preferred.

Furthermore, a premixer preferably should be compatible with the remainder of the system design. For example, in low-turbulence systems, the premixer should not rely on or introduce large-scale turbulence inconsistent with the overall system design. In other TVC designs, the premixer should introduce mixture in a manner consistent with the desired cavity flow field.

With the foregoing principles and observations in hand, two complementary premixer designs have been developed. FIG. 1 is a perspective cross-sectional view from the inlet side to the exit side of a combustor incorporating examples of these two different premixer devices, 21 and 31, in accordance with certain embodiments of the invention.

The combustor of FIG. 1, while axis-symmetric in internal configuration, is a "can" design (sometimes referred to as "can-annular", but to be distinguished from "full annular" designs), such that a plurality of such "cans", each as partially shown in FIG. 1, can be arranged in a circular configuration, with their outlet commonly directed around a large turbine. Such arrangements are commonly used to power large-scale gas turbines for power generation applications, for example, where the shaft of the turbine drives a large electric generator. While FIGS. 1 and 4 focus on a can design, those of skill in the art will recognize that the principles of this design may be readily adapted to a "full annular" combustor design, wherein a single, annular combustor is designed to mate with, for example, the annular fluid inlet of a turbine. Full annular designs may be used, for example, in commercial jet aircraft engines and auxiliary power units (APUs), in addition to large-scale power generation turbines. All of these configurations, and the applications that they support, are within the scope of the present invention.

The can combustor in the embodiment shown in FIG. 1 has an inlet 6, an exit 5, and a recirculation zone 7, with a take-off point 14. In three dimensions, recirculation zone 7 forms a toroidal structure around the axis of main flow from inlet 6 to exit 5, within which a vortex 22 will recirculate during combustor operation, with a portion of the combustion gasses being taken off at point 14 and recirculated along and within curved wall 23, around toroid 7 to rejoin inlet 6. Compressed combustion air is introduced at compressor inlet 10, upstream of inlet 6. Inlet premixer 21 is situated between compressor inlet 10 and combustor inlet 6. In this embodiment, a generally conical bluff body 3 and 4 is provided between premixer 21 and combustor inlet 6 to provide a nozzle to accelerate premixed mixture exiting premixer 21. (Note, however, that in an annular design, the bluff body might be a "2D" element instead, extended annularly (as tapered ring) around the entire annular combustor inlet, instead of forming a cone-like structure as shown.)

In other particulars of this embodiment, bluff body 3, 4 terminates against plate 11, which, in three dimensions, forms a circular wall in the center of the inlet area 6; bluff body 3, 4 is supported by radial spokes 17, circumferentially arranged within inlet area 6; holes 16 are provided in plate 11 for purposes of wall cooling (effusion, impingement effusion, or the like); upstream the combustor inlet is pressure port 12; and a mounting point 15 is provided for an igniter (not shown) in the wall of the toroid. Further in this embodiment (i.e., a can combustor), the combustor is housed within generally can-shaped enclosure 41.

In the illustrated embodiment, a second premixer 31 (vortex premixer) is also provided. The second premixer injects into recirculation space 7, but differs in its approach from injection of premixed fuel and air as practiced in the prior art. In prior art vortex premixers, premixed fuel and air was introduced into the TVC cavity in a manner calculated either to create one or more additional and entirely new vortices, or to substantially disrupt the flow fields of a naturally existing vortex. In the illustrated embodiment, the injection of premixed fuel and air into the vortex area is designed to enhance natural vortex flow in the cavity, for example, being introduced into the cavity along an exterior wall, in a direction tangential to and codirectional with the natural recirculation flow in the cavity. Thus, it enhances the vortex flow, without disruption or significant added turbulence.

It should be understood that while FIG. 1 depicts both premixer 21 and premixer 31 in place, either one of premixers 21 or 31 could be provided and the other eliminated, although as discussed later in this disclosure there are operating modes in which it is advantageous to have both premixers.

In one embodiment, vortex premixer 31 comprises a number of fuel injectors each arranged around the periphery of the outer wall of toroid 7, directed tangentially relative to the direction of the combustor exit, near top dead center of toroid 7 and therefore approximately tangential thereto, to inject premix mixture codirectionally with the natural recirculation flow of fluid in toroid 7. Only one such injector is shown in the sectional view of FIG. 1, but it should be understood that the injector structure is replicated by similar injectors side-by-side around the periphery of toroid 7.

The two premixer systems will now be described in further detail.

The Inlet Premixer

Figure 2A:
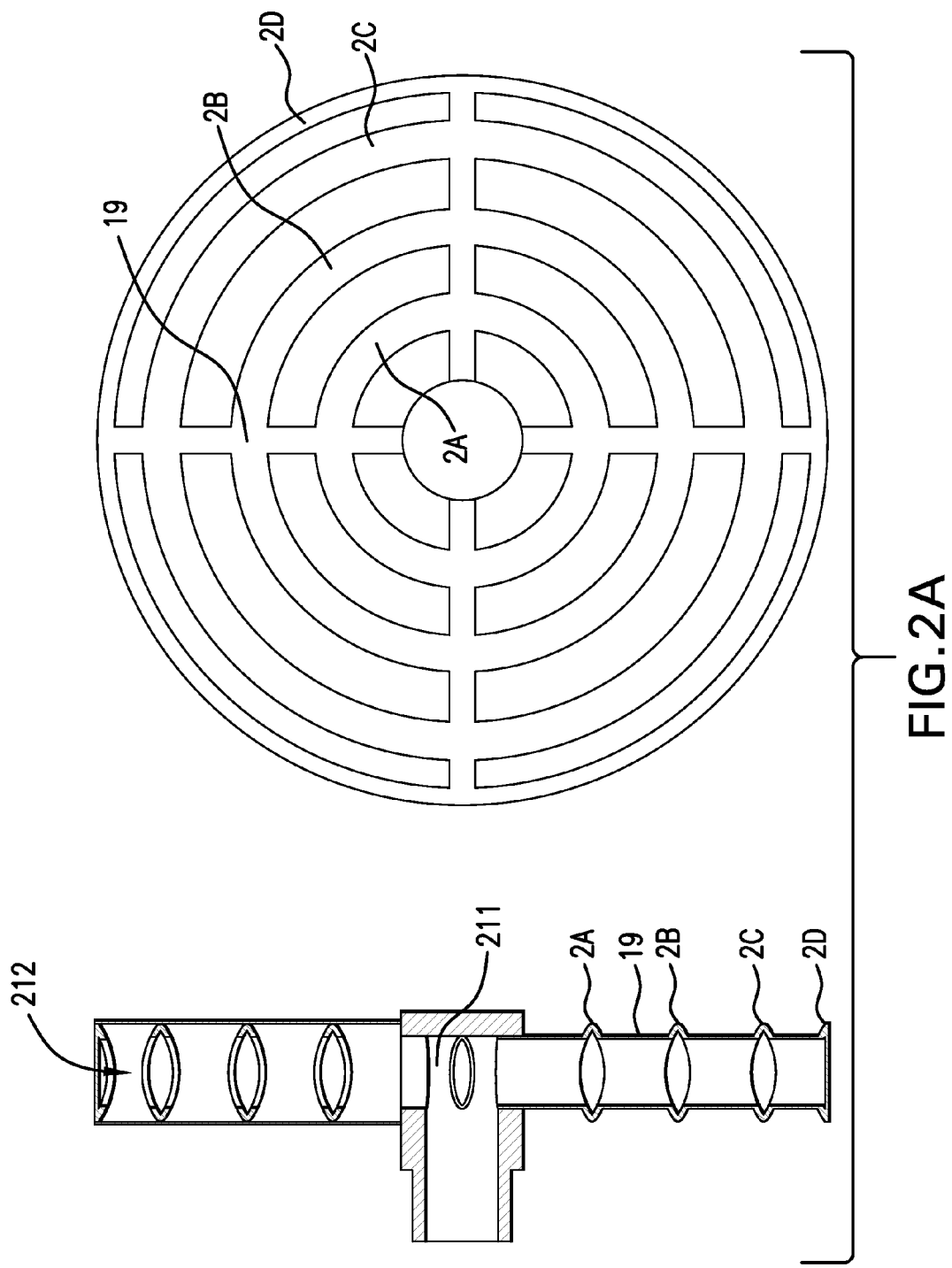
FIG. 2A shows cross-sectional views of the inlet premixer shown in FIG. 1.
Figure 2B:
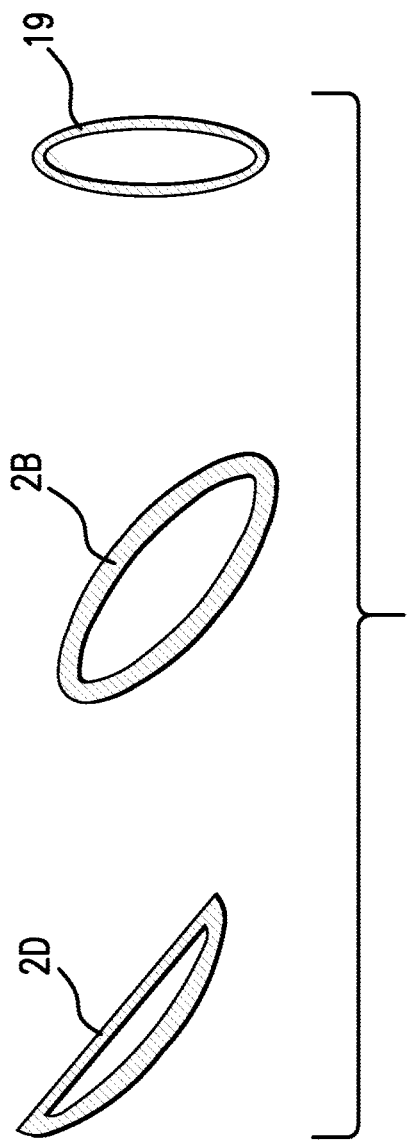
FIG. 2B shows detailed cross-sectional views of spoke and ring elements comprising this premixer.

FIGS. 2A, 2B and 3 show further detail on inlet premixer 21. In the embodiment reflected in premixer 21, fuel (which can be gaseous or liquid fuel) is introduced at fuel inlet 13 into central hub 1 and issues via the four radial spokes 19, etc. into the four concentric rings 2A, 2B, etc. mounted on the fuel spokes. Fuel is injected at an angle in the range from 0-90 degrees from the axial direction (either positive or negative (i.e., either away from or toward the axis, depending on the specific ring pairing)), but in any case so that the absolute value of the angle is in the range of from 0-90 degrees, and more preferably 30-90 degrees from the axial direction) into the annular passages formed between adjacent rings 2A, 2B, etc., into the high-velocity air from the compressor.

Concentric rings 2A, 2B, etc. and spoke 19 are aerodynamically shaped as shown in FIG. 2B. The number of rings should be in the range from 2 to about 5, and should preferably provide less than 50% or more preferably less than 40% flow blockage. Fuel orifices (holes) 201, 202, etc. in rings 2A, 2B, etc. are selected to provide adequate fuel penetration into the incoming air so as to provide the most thoroughly mixed (minimal unmixedness levels) mixture over the engine's operating envelope. Hence, they will be of different sizes/diameters, to target various points on the load curve.

In an alternate embodiment, fuel can be fed to the spokes from the outside diameter 212 of the ring structure, rather than the hub 211.

Preferably, holes 201 and 202 are directed to inject fuel in a predominantly radial direction, into the cross-flowing compressor air. In this embodiment, for ease of manufacture, the holes are directed at approximately ±70 degrees relative to the axial direction. However, this angle is not critical. In general, the range of angles can be from about ±0 degrees to about ±90 degrees; is preferably between about ±60 and about ±90 degrees; and more preferably about ±90 degrees.

The holes sizes are non-uniform, with different size holes provided for better performance in different power ranges, i.e., different fuel-air momentum flux ratio levels. The various hole sizes can be determined either through cold flow mixing experiments, CFD or empirical correlations, or any combination thereof. The total number of holes may be greater than the corresponding number in a conventional premixer.

In one configuration, hole sizes are selected to provide a plurality of holes in three different sizes, adapted to give the best mixtures in low, middle and high power bands, respectively. For example, the small holes may be sized for optimal low power operation (0-30% engine load); the medium holes for optimal medium power operation (0-70% engine load); and the large holes for optimal high power operation (70-100% engine load), and used in combination to provide the most uniform mixing over the entire power range. Preferably, each hole is paired with a hole of a different size, on two adjacent rings, across the annular passage defined by the two rings. Each of the aforementioned hole diameters (three different diameters in this example, though there could be a greater number) may be circumferentially distributed approximately evenly to assure the most uniform mixture within the cross-sectional area of the premixture inlet.

An exemplary hole layout is shown in FIG. 3. Angles $\chi 1$ and $\chi 2$ (not shown in the drawings) are radial angular hole offsets. The following table shows, as one possible example, the hole layout for one quadrant, for the eight rows of holes in the illustrated embodiment:

| Row # | Angle $\chi 1$ (First Hole) | Angle $\chi 2$ (Spacing) | # Holes |
|---|---|---|---|
| 1 | 15 | 12 | 6 |
| 2 | 7 | 12.6 | 7 |
| 3 | 6 | 7.8 | 11 |
| 4 | 4.25 | 6.8 | 13 |
| 5 | 3.5 | 5.2 | 17 |
| 6 | 3.5 | 3.6 | 24 |
| 7 | 3.5 | 3.3 | 26 |
| 8 | 3 | 6.5 | 14 |

The combination of these features provides for reduced mixing length and scales, a wider envelope of mixedness uniformity over the engine operating range, and is gas and liquid fuel compatible.

Prior art fuel-air mixers also include some hub-and-spoke designs as previously discussed. However, they do not inject fuel from concentric rings or provide a plurality of different injection hole sizes, and they do not exhibit and/or achieve the same degree of mixing uniformity at any given engine load point. The prior art premixing strategy will not achieve the lower emissions performance of the present invention.

The inlet premixer described above achieves flat mixedness profiles and ultra Low combustion exhaust levels for NOX, CO, UHC, etc. due to the higher level of mixedness levels achieved by (a) nonuniform hole sizes, (b) a multitude of holes, and (c) smaller/shorter mixing scales. This provides better mixing uniformity overall and over a greater engine operating envelope. The approach described here can be tailored to any engine fuel scheduling (i.e., how the fuel is metered over the engine's operating envelope: fuel vs. engine load), and is gas or liquid fuel compatible. It may be adapted to any combustor that uses liquid and/or gaseous fuel, for any application, including without limitation power generation, main propulsion jet engines for aviation (including turbofans, turbojets, ramjets, etc.), and APUs.

Several months of combustion testing at several generic gas turbine engine operating load points has shown that this premixer, in conjunction with the other components described herein, can provide ultra low emissions results (NOX, CO, UHC<3 ppm 15% $O_2$ simultaneously).

The Vortex Premixer

Figure 4:
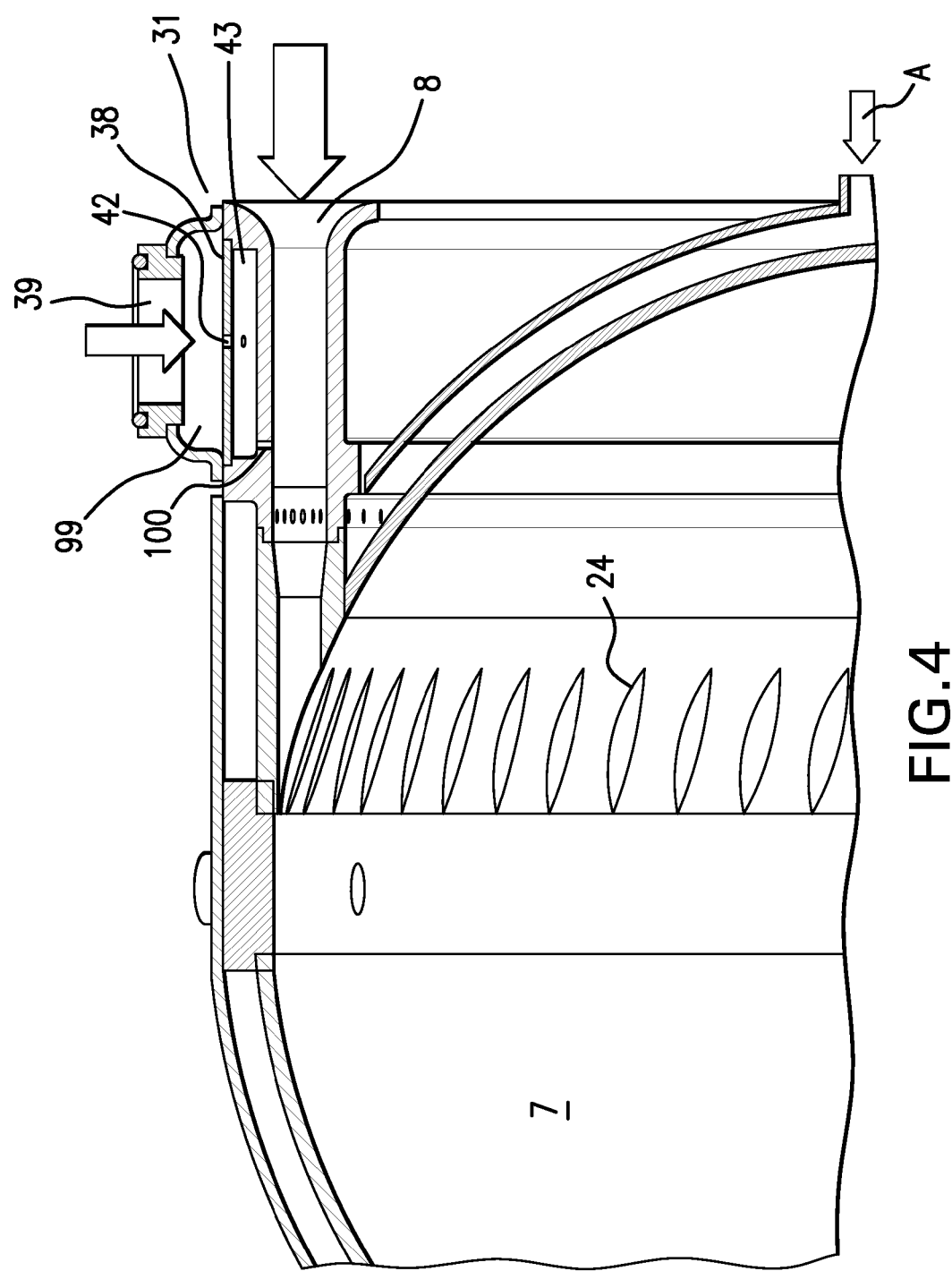
FIG. 4 is a partial cutaway and perspective view from outside the toroid of the vortex premixer shown in FIG. 1.

In one embodiment, as illustrated by vortex premixer 31 in FIGS. 1 and 4, fuel and air are premixed prior to injection into the toroid/cavity flow. The injectors provide small mixing scales, a plurality of injection sites, and short required premixing length. Fuel and air are premixed, or partially premixed prior to injection into the toroid. The secondary injection of the premix assists with general stability of the toroid/cavity flow.

In the embodiment shown in FIG. 1, the natural flow in toroid 7, that is the flow that would exist without premixture injection, for example as a result of fluid flow through the main flow path of the combustor (from inlet 6 to exit 5), would be a single vortex 22 circulating from a takeoff point 14 proximate the exit, along the curvilinear wall of the recirculation space of toroid 7, and back to a point proximate the inlet 6 of the combustor. In this embodiment, vortex cavity 7, though accommodating a single vortex, is relatively large, lengthening the residence time for combustion within the cavity. In a departure from the prior art, premixer 31 injects premixed fuel and air directly into the recirculation zone (trapped vortex cavity) 7 tangentially to wall 23, and thus aligned with the natural vortex flow 22 in the cavity, to introduce the premixture with a minimum of disruption to the natural flow pattern of vortex 22 and without substantial added turbulence.

As shown in FIG. 4, vortex premixer 31, in one embodiment, has a separate fuel manifold 99 fed by tubular fuel inlet 39, in close proximity to the air entry ports 8, which issues fuel into the incoming air flow through port 8 prior to injection within the cavity. In the embodiment shown, fuel manifold 99 encircles toroid 7, but there is only a single fuel inlet 39 (although the inlet could be replicated in other radial positions). Furthermore, in this embodiment, fuel manifold 99 is divided by circular diffusion (DP) plate 38 having holes 42 etc. for metering fuel into submanifold 43, to reduce circumferential non-uniformities in fuel pressure in a single feed tube arrangement. Fuel flowing from submanifold 43 enters the incoming air flow (from 8), through fuel orifices (holes) 100, etc., mixes with the incoming air, and enters the toroid 7 through hole 24. The manner of premixing is not critical but in the current embodiment will be a simple jet in cross flow. The application can be any fluid fuel type—liquid, gas, low BTU, Hydrogen enriched ("synthetic") gas, etc.

As indicated by the plurality of holes 24 in FIG. 4, elements 8, 100 and 24 are replicated circumferentially around the periphery of toroid 7, and fuel manifold 99 forms a cylindrical structure commonly feeding all the premixer inlets. In this embodiment, recirculation vortex flow is from exit 5 to inlet 6, and incoming premixture is directed into toroid 7 in a manner designed to result in smooth entry, approximately tangential to and in about the same direction as, the recirculation vortex flow, with low turbulence. In one embodiment, there could be approximately 100 or more such holes (24, etc.), evenly spaced around the annular periphery of the outer wall of toroid 7, each having a diameter of a fraction of an inch, directed tangentially right before the point of extreme outer circumference of toroid 7. For example, in one embodiment, there could be approximately 100 or more injector ports arranged around the annular periphery of the outer wall of toroid 7, each having a diameter of about 0.1 inch to about 0.2 inch. In general it is desirable to have a plurality of injector ports, for even and continuous premix introduction, and the greater the number of ports, the smaller the port diameter (as scaled to the overall dimensions of the vortex container), with the higher numbers and smaller port sizes at any particular size scale being limited by fluid flow considerations as friction increases due to small port diameters. In this manner, the incoming mixture enters smoothly, forming a boundary layer for vortex 22.

The premix charge that is issued into the toroid through vortex premixer 31 both strengthens/reinforces the toroidal flow and also provides a high combustion intensity pool of radicals to further stabilize the main flow.

Premixer 31 can be located anywhere around the periphery of toroid 7, but, when recirculation is a single vortex moving in the direction from exit to inlet, is preferably in the quadrant shown in FIG. 4, and more preferably with the inlet close to point A in that Figure (i.e., closer to take off point 14) for a longer residence time.

The premixer-TVC combination shown in FIGS. 1 and 4 reflect how an embodiment of the present invention might be incorporated in a can combustor. In large-scale power generation applications, a plurality of such combustors may be deployed in a generally circular arrangement to exit into a gas turbine, in turn coupled to an electric generator.

The air entry ports 8 could also be adapted from the can configuration shown, to an annular configuration. The arrangement of ports in an annular configuration would be topologically similar to that shown in FIG. 4, dimensioned to fit around the periphery of an annular combustor. An annular combustor may also be attached to a gas turbine for large-scale power generation. In addition, an annular adaptation of the invention can be applied, for example, to a main propulsion jet engine application for aviation (including turbofans, turbojets, ramjets, etc.), or to a smaller gas turbine/electric generator for use as an APU. Other applications include combustion turbines in an Integrated Gasification Combined Cycle (IGCC) plant, and in Combined Heat and Power (CHP) or cogeneration plants.

Figure 5:
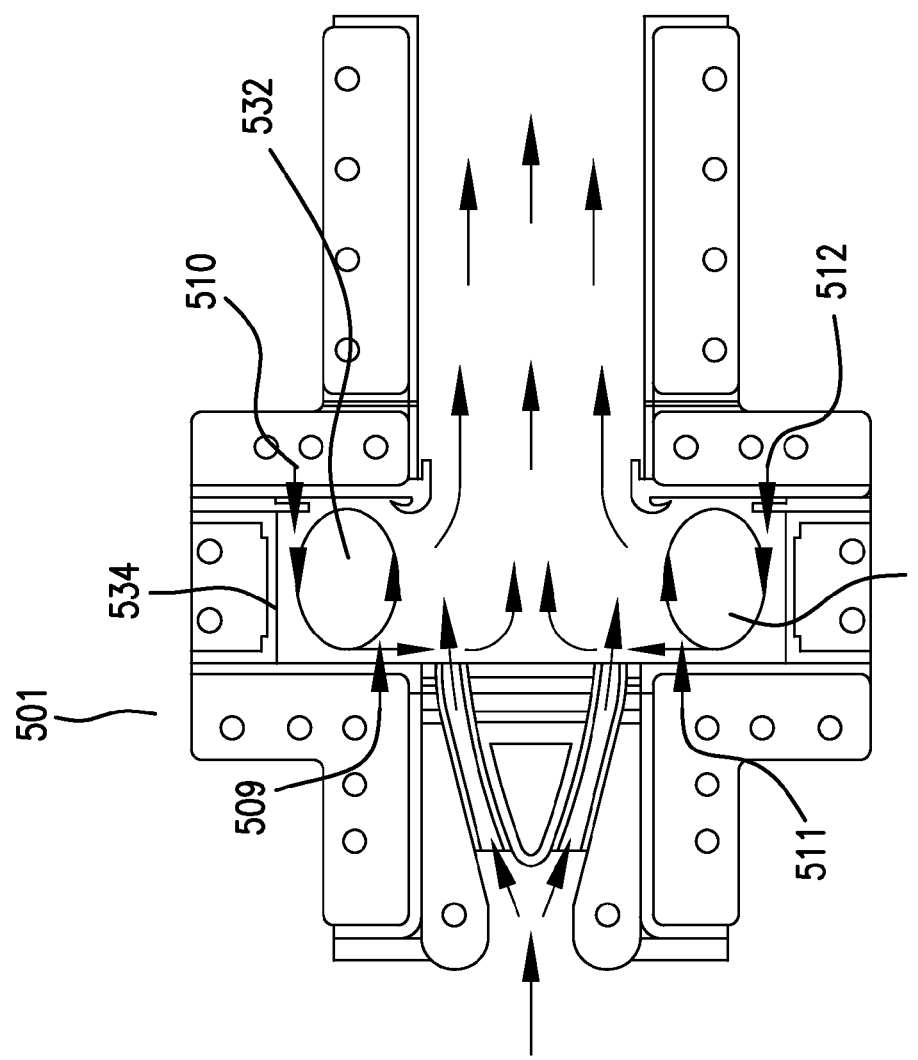
FIG. 5 shows an alternate embodiment of a vortex premixer used in combination with a TVC having rectlinear walls in the trapped vortex cavity.

The vortex mixer described herein is not limited to TVC designs with curvilinear walls as shown in FIGS. 1 and 4. For example, as shown in FIG. 5, a vortex premixer may be used with a TVC cavity having rectangular walls 534 etc. TVC cavity 532 within combustor 501 as shown in FIG. 5 has a surrounding wall contour that is approximately rectangular on three sides. (In this embodiment, TVC cavity 531 is essentially a mirror image of TVC cavity 532 and set up similarly). TVC cavity 532 is shaped and dimensioned such that a single vortex approximately indicated by arrow 533 will be established therein by main flow 534 through combustor 501. Premixed fuel and air may be introduced in a manner that enhances the natural vortex flow in the TVC cavity, for example at one or both of at one or both locations corresponding to arrows 510 and 509. In the case of arrow 510, the premixture injection is approximately tangential to vortex 533 and enters substantially along wall 534 adjacent to vortex 533. In the case of arrow 509, representing an additional premixer that may or may not be used in conjunction with the one associated with arrow 510, injection is again approximately tangential to vortex 533, and also substantially aligned with the direction in which incoming flow 535 joins the flow of vortex 533.

A TVC design as shown in FIG. 5 may be used in a three-dimensional rectangular structure (i.e., extending above and below the page of FIG. 5), of which FIG. 5 would represent a cross-section. Alternately, the TVC design with such cavities may "wrap around" three-dimensionally in an annulus, to form an annular combustion chamber, with "upper" and "lower" toroidal vortex cavities having rectilinear walls, again with a cross-section corresponding to the upper and lower cavity areas 531 and 532 depicted in FIG. 5. The rectangular design could be used as a can combustor, and the annular design as an annular combustor, and respectively deployed in applications similar to those described with respect to the embodiment of FIGS. 1 and 4.

Fuel Staging

Although, as previously stated, premixers 21 and 31 can function independently, a combination of the two premixers, 21 and 31, described here, or a combination of inlet and direct-vortex injectors of other types, can be used in a fuel staging strategy in any TVC application.

Increasing the fuel intake through vortex premixer 31 relative to inlet premixer 21 can make operation more stable during engine turndown and part-power application. Adding relatively equal amounts of air to both 31 and 21 premixers permits superior turndown performance. This can be engine dependent, so these fractions can change. Typically, however, air through premixer 31 should generally be less than the air through premixer 21, or more narrowly, 20-40%.

Figure 6A:
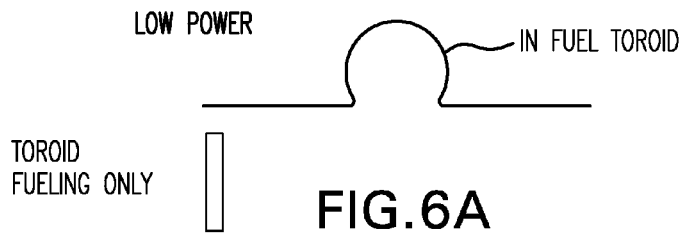
FIGS. 6A-6C show examples of fuel staging strategies in accordance with one embodiment of the invention.
Figure 6B:
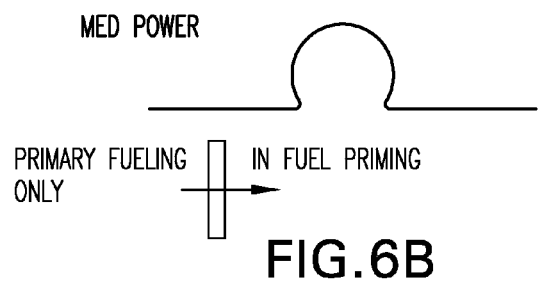
Figure 6C:
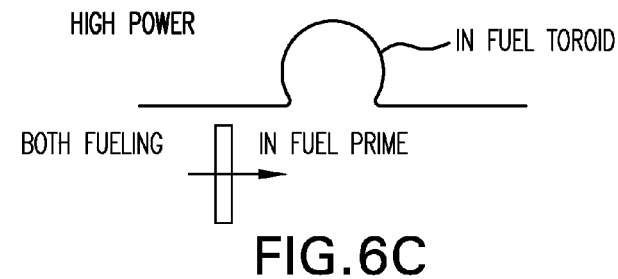
Figure 6D:
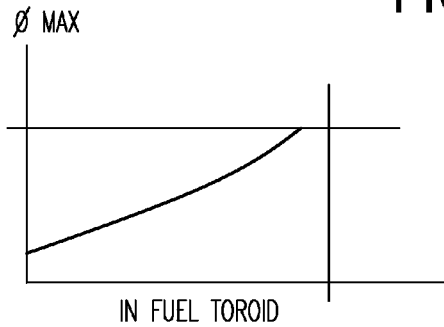
FIGS. 6D-6E are corresponding graphs of flame temperature vs. engine power.
Figure 6E:
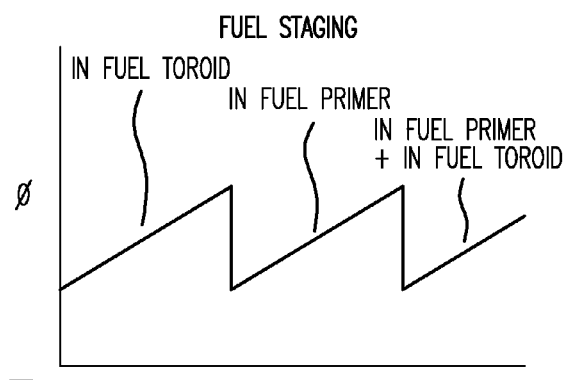

More generally, fuel staging, as envisioned by one embodiment of this invention, entails injecting fuel at multiple and discrete locations in the combustor to maintain flame temperatures in narrow bands, so that NOX/CO/UHC emissions are below target rates. As the engine spools up, fuel is initially injected solely through holes 100 of vortex premixer 31 until flame temperatures ($\phi$) reach their NOX limit. See FIGS. 6A and 6D. In a mid-power band (FIG. 6B), operation is switched so that fueling is primarily through inlet premixer 21. In high power ranges (FIG. 6C), fuel is injected both through inlet premixer 21 and vortex premixer 31. Fueling discrete zones in this manner permits "walking' up the power curve while maintaining NOX and CO within prescribed limits, as required in view of flame temperature requirements. See FIG. 6E.

In addition, the combustor can be designed with a plurality of TVC cavities, each with separate premixer inlets. Injection into the respective TVC cavities can be varied relative to each other and relative to inlet premixing, to provide finer control, and also to improve temperature uniformity during turndown by allowing incremental changes in fueling through a sequence of cavities, rather than relying on larger fueling changes in a single cavity.

With reference to the embodiment in FIGS. 1 and 4, preferably, vortex premixer 31 is not completely turned off during operation. Rather, it is preferable to phase the proportions of fueling from one premixer to the next, while always keeping vortex premixer 31 at least minimally turned on.

Other embodiments may involve a plurality of TVC cavities. For example, an embodiment as shown in FIG. 7A comprises two TVC cavities positioned axially, upstream TVC cavity 702 and downstream TVC cavity 703, with corresponding premixer inlets 742 and 743, as well as inlet premixer 791.

A plurality of premixer-fed TVC cavities may include TVC cavities that are radially positioned with respect to each other. One example of such an arrangement is shown in FIG. 7B, showing radially arranged cavities 712 and 713, and corresponding premixer inlets 752 and 753, as well as inlet premixer 792.

Each TVC cavity in multi-cavity arrangements, such as those illustrated by FIGS. 7A and 7B, may have its own vortex premixer inlet as shown (or alternatively, discrete fuel and/or air inlets), which can be fueled independently of the other cavities and/or the main inlet. Such arrangements provide a greater number of fuel-air zones and accordingly can provide better turndown performance by spreading fueling changes across a greater number of combustion areas.

Figure 7C:
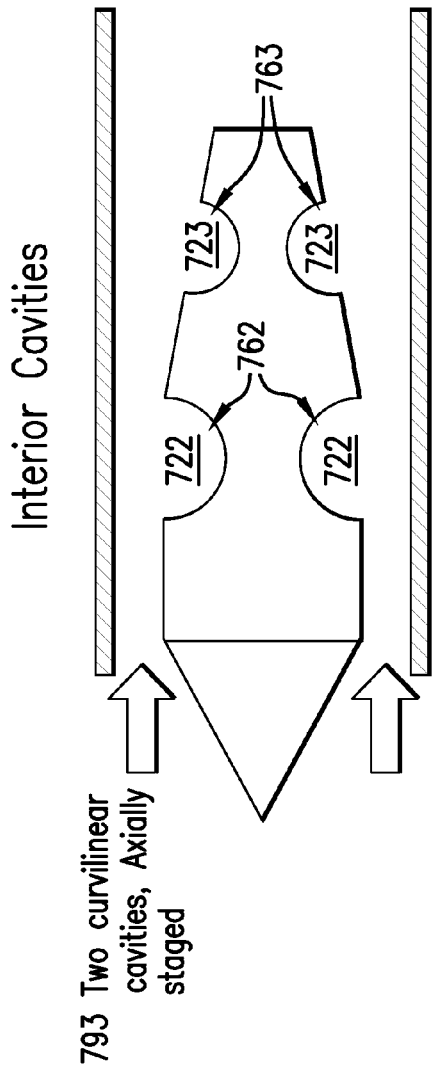
Figure 7D:
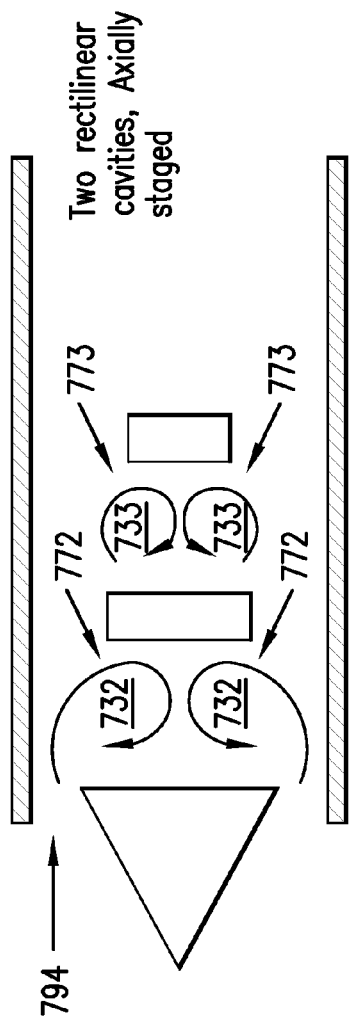

In other embodiments, the TVC cavities may be situated solely in the inside of the combustor, as shown in FIGS. 7C and 7D. Such cavities may, for example, be curvilinear and axially staged, such as cavities 722 and 723 in FIG. 7C, and corresponding premixer inlets 762 and 763 (as well as inlet premixer 793), rectilinear and axially staged, such as cavities 732 and 733 in FIG. 7D and corresponding premixer inlets 772 and 773 (as well as inlet premixer 794), or other combinations of cavity shapes, locations and arrangement.

Preferably, in an axially arranged multi-cavity TVC embodiment, the most upstream cavity (at a minimum), e.g., cavity 702 in FIG. 7A, would be continuously fueled during operation, albeit at a variable level. In a radial configuration, preferably the largest cavity on a radius (at a minimum), e.g., cavity 712 in FIG. 7B, would be continuously fueled during operation, again, at a variable level.

As stated above, the manner of operation described above is not limited to the inlet and vortex premixers specifically depicted or described in the present disclosure. While the principle of operation of "fuel staging" as envisioned hereby is primarily described with particular reference to the premixer designs specifically taught herein, it should be appreciated that any TVC that provides a combination of an inlet premixer and a direct vortex premixer can potentially benefit from this method.

The combination of an inlet premixer and one or more vortex premixers, which may be independently fueled, provides better optimization than previously available for ultra low emissions performance. Each of the premixers preferably provide for reduced mixing length and/or scales, result in a wider range of mixedness uniformity over the engine operating envelope, and therefore superior emissions performance, are multi fuel compatible (gas or liquid), can be tailored to any engine fuel scheduling and indeed are optimal for fuel staging applications.

For example, in an axial multi-cavity layout such as that shown in FIG. 7A, one fuel staging strategy for turning up and turning down the combustor might involve fueling through the first toroid premixer inlet 742 from 0-33% power, backing off premixer 742 and fueling primarily through main inlet premixer 791 over the range of 33-66% power, and then using substantial flow though all three of premixers 791, 742 and 743 for the range of 66-100% power. Similar as well as varied strategies may be devised for any of the layouts depicted in FIGS. 1, 4, 6A-6C, 7A-7D, and other configurations. In some embodiments, the fuel controls for the respective premixers may be manually actuated; in other embodiments, the controls may be computerized, based on inputs such as power, temperature, NOX or CO concentration, time, etc., or may be computerized with manual overrides.

The fuel staging approach outlined above is not limited to use with premixers having the structural characteristics discussed in connection with FIGS. 1 and 4. For example, Haynes et al. employs conventional premixers for both the main combustor inlet and the TVC cavity. Nevertheless, a similar technique to that described above could be practiced with such a combustor to phase fuel and air flow from one premixer to another, or to a combination of premixers, as best suited operation in various power bands.

Similarly, the utility of fuel staging as described above extends to all types of gas turbine applications requiring variable power output, including large frame power generation, aviation applications including main propulsion jet engines (including turbofans, turbojets, ramjets, etc.) and APUs, as well as to combustion turbines in an Integrated Gasification Combined Cycle (IGCC) plant, and in Combined Heat and Power (CHP) or cogeneration plants.

It is apparent, therefore, that the invention meets the objectives set forth above and provides a number of advantages in terms of ease of use and effectiveness, over the prior art. Although the present invention has been described in detail, it should be understood that various changes, substitutions, and alterations may be readily ascertainable by those skilled in the art and may be made herein without departing from the spirit and scope of the present invention as defined by the claims.

I claim:

1. A combustion apparatus for use with a fuel staging method wherein proportions of fuel at a plurality of fuel introduction points within said combustion apparatus are varied in accordance with power requirements, said combustion apparatus comprising:
   (a) a plurality of trapped vortex combustion (TVC) cavities;
   (b) a premixer in combination with said plurality of TVC cavities, said premixer comprises an inlet premixer and a plurality of vortex premixers;
   (c) said inlet premixer comprises a main inlet, said main inlet originating a main flow through said combustion apparatus, and a plurality of concentric, coplanar, aerodynamically shaped ring elements positioned upstream of said plurality of TVC cavities, axially aligned within a flow path, each said ring element having an interior passage for fuel, each said ring element further comprising a plurality of fuel injection orifices whereby fuel flows from said interior passage into the inlet fluid flow proximate to said ring, and wherein each pair of said ring elements defines an annular passage therebetween;
   (d) at least one of said plurality of vortex premixers is attached to at least one of said plurality of TVC cavities, wherein said at least one of said plurality of vortex premixers comprises a fuel inlet, an air inlet, a chamber wherein fuel and air are mixed, and an outlet for the fuel and air mixture, said fuel inlet including a fuel manifold with a diffusion plate disposed therein;
   and wherein said fuel and air mixture is introduced directly into said at least one of said plurality of TVC cavities in a direction tangential to a recirculation flow within said at least one of said plurality of TVC cavities; and wherein the flow of fuel through each of said plurality of vortex premixers is independently variable;
   (e) a conical bluff body located directly downstream of said inlet premixer and upstream of said plurality of TVC cavities, configured to provide a nozzle and accelerate a premixed mixture exiting said inlet premixer.

2. The combustion apparatus of claim 1, wherein said combustion apparatus is annular, said main flow defines an annulus through said combustion apparatus.

3. The combustion apparatus of claim 2, wherein said plurality of TVC cavities are arranged axially with respect to the annulus defined by said main flow.

4. The combustion apparatus of claim 3, wherein said plurality of TVC cavities are situated peripherally in said annular combustor, outside of the annulus defined by said main flow.

5. The combustion apparatus of claim 4, wherein said plurality of TVC cavities comprises a first, upstream peripheral TVC cavity and a second, downstream peripheral TVC cavity.

6. The combustion apparatus of claim 5, wherein said TVC cavities are defined by curvilinear walls.

7. The combustion apparatus of claim 5, wherein said TVC cavities are defined by rectilinear walls.

8. The combustion apparatus of claim 3, wherein said plurality of TVC cavities are situated internally within said annulus defined by said main flow.

9. The combustion apparatus of claim 8, wherein said plurality of TVC cavities comprises a first, upstream internal TVC cavity and a second, downstream internal TVC cavity.

10. The combustion apparatus of claim 2, wherein said plurality of TVC cavities are arranged radially with respect to the annulus defined by said main flow.

11. The combustion apparatus of claim 1, wherein said TVC cavities are defined by curvilinear walls.

12. The combustion apparatus of claim 1, wherein said TVC cavities are defined by rectilinear walls.

13. An assembly comprising the combustion apparatus of claim 1 coupled to a gas turbine, said assembly being adapted for electric power generation.

14. An assembly comprising the combustion apparatus of claim 1 coupled to a gas turbine, said assembly being adapted for use as a propulsion jet engine for aviation.

15. An assembly comprising the combustion apparatus of claim 1 coupled to a gas turbine, said assembly being adapted as an auxiliary electric power generation unit.

16. An assembly comprising the combustion apparatus of claim 1 coupled to a gas turbine, said assembly being adapted as a combustion turbine for a combined heat and power plant.

17. An assembly comprising the combustion apparatus of claim 1 coupled to a gas turbine, said assembly being adapted as a combustion turbine for an integrated gasification combined cycle plant.

18. The combustion apparatus of claim 1, wherein said at least one of said plurality of vortex premixers is disposed at a downstream side of said at least one of said plurality of TVC cavities.

19. The combustion apparatus of claim 1, wherein said fuel and air mixture is introduced through said outlet extending along a curvilinear length of a wall of said at least one of said plurality of TVC cavities.

* * * * *